United States Patent [19]

Sasaki

[11] Patent Number: 5,079,413
[45] Date of Patent: Jan. 7, 1992

[54] CARD READER USING LINEAR CARD CONVEYER MEANS

[75] Inventor: Hitoshi Sasaki, Kanagawa, Japan

[73] Assignee: NHK Spring Co., Ltd., Yokohama, Japan

[21] Appl. No.: 644,214

[22] Filed: Jan. 22, 1991

Related U.S. Application Data

[62] Division of Ser. No. 276,616, Nov. 28, 1988.

[30] Foreign Application Priority Data

Nov. 27, 1987 [JP] Japan ................... 63-299606
Jan. 28, 1988 [JP] Japan ................... 63-017965

[51] Int. Cl.⁵ ............................................ G06K 13/04
[52] U.S. Cl. ..................... 235/479; 235/449; 360/2
[58] Field of Search ............... 235/449, 479, 487; 360/2, 97; 369/258

[56] References Cited

U.S. PATENT DOCUMENTS 4,309,601 1/1982 Nally ............................. 360/2
4,636,891 1/1987 Barski ....................... 235/479 X
4,994,658 2/1991 Takahashi ................... 235/479

Primary Examiner—Harold Pitts
Attorney, Agent, or Firm—Jeffers, Hoffman & Niewyk

[57] ABSTRACT

In a card reader for reading information from a card which may contain the information as optical, magnetic, electronic or physical data, inside a casing is provided a carriage which carries the card and is adapted to be conveyed from an outer position to an inner position by a linear drive mechanism. By not using a pair of drive and pinch rollers as opposed to conventional card readers, the card is free from contamination by the rollers, and the operation reliability of the card reader is improved. Further, the elimination of rollers also contributes to the reduction in the overall height of the card reader. The clamp mechanism for securing a card to the carriage may be provided with interlocking means which prevents the movement of the carriage until a card is securely gripped by the clamp mechanism.

1 Claim, 4 Drawing Sheets

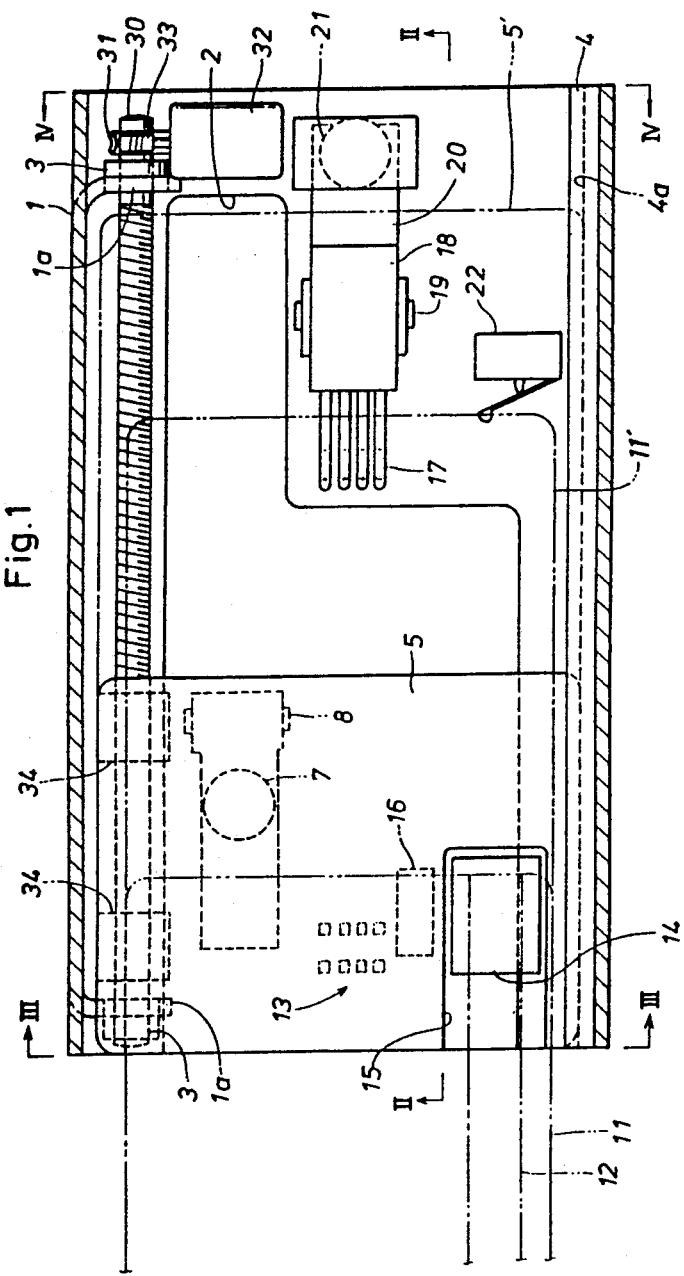
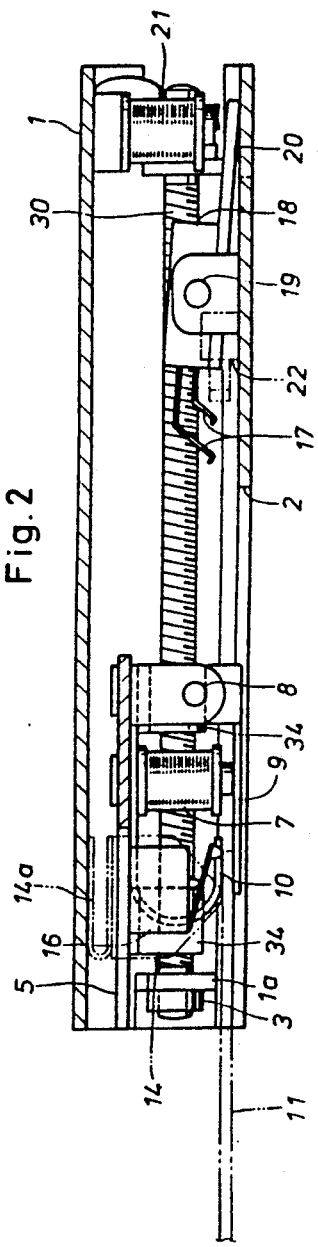

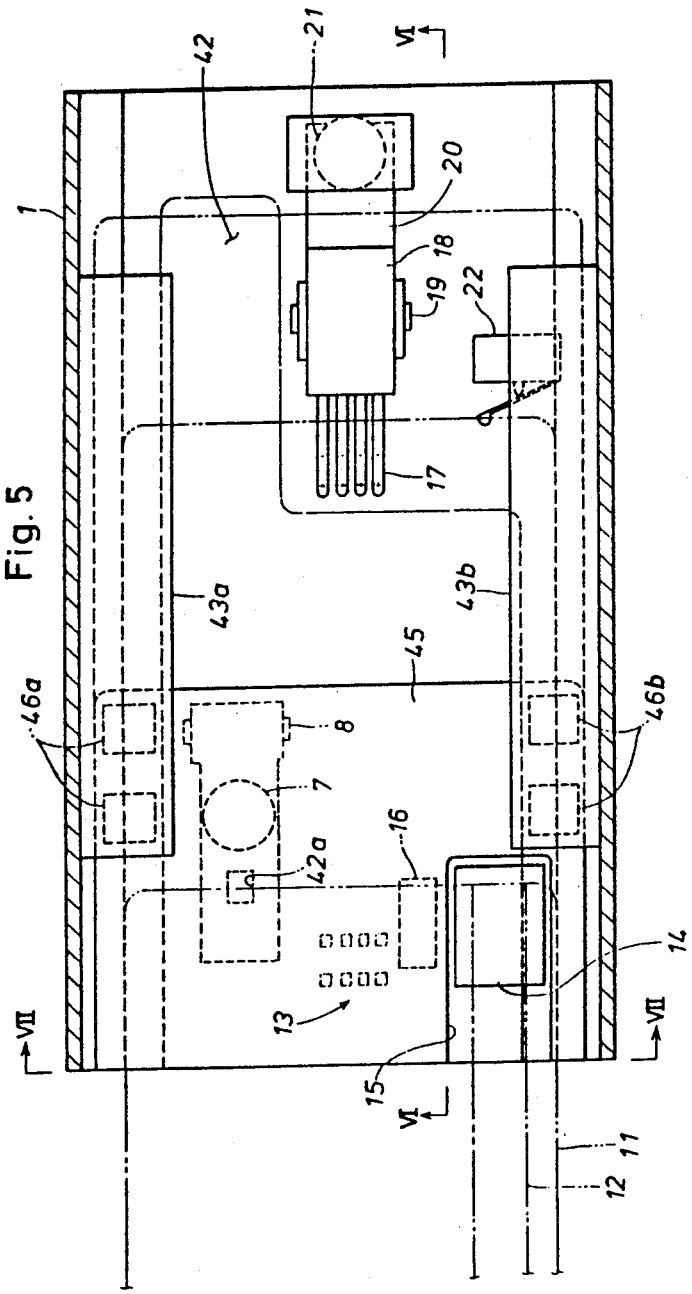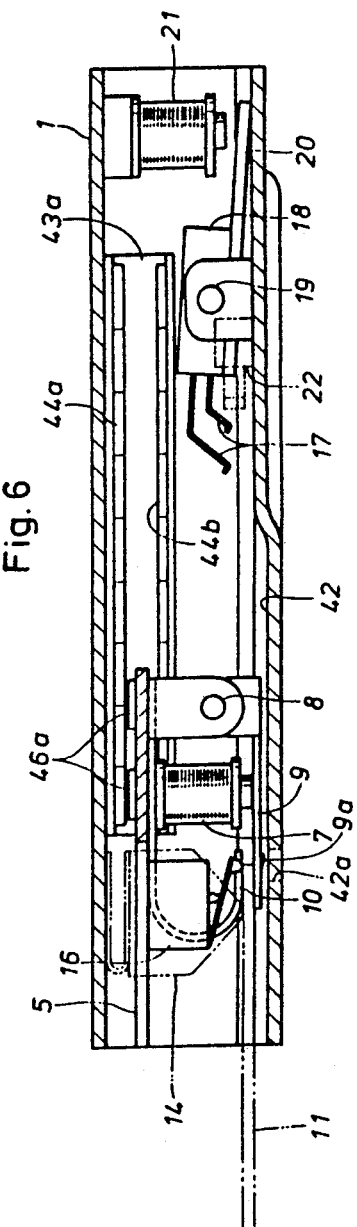

5,079,413

CARD READER USING LINEAR CARD CONVEYER MEANS

This is a division of application Ser. No. 07/276,616 filed Nov. 28, 1988.

TECHNICAL FIELD

The present invention relates to a card reader for reading information from a card which may contain the information as optical, magnetic, electronic or physical data. The card reader may be optionally provided with means for erasing or writing information from or into the card. The present invention is in particular related to a card reader for reading information from an IC card which incorporates an IC (integrated circuit) memory device therein for storing information.

BACKGROUND OF THE INVENTION

In a conventional card reader, such as the IC card reader disclosed in Japanese patent laid open publication No. 60-207987, a card is conveyed between a card inserting position and an information accessing position by a pair of drive and pinch rollers which directly interpose the card therebetween. However, such conventional card readers are known to have the disadvantage that they may contaminate or damage the card. Contamination of a card by rollers produces a particularly adverse effect when the card is an IC card which is provided with contact pads for data access on its surface as it may cause poor contact between the contact pieces of the card reader and the contact pads. Furthermore, because a pair of rollers, each having a certain diameter, are arranged above and below the passage through which the card is to be conveyed, it has been difficult to reduce the overall height of the card reader, and it imposed some problem when such a card reader is to be installed into a larger system.

It is conceivable to equip a card reader with a receptacle and a lid to place a card into the receptacle card and close the lid thereupon to accomplish a required electric contact without conveying the card within the card reader. However, according to this proposal, the user has to open the lid and close it in addition to placing the card in the receptacle, and the convenience of the card reader is significantly impaired. Further, since the opening the lid exposes sensitive parts of the card reader, the possibilities of tampering the internal mechanism and inclusion of undesirable foreign matters will be a major problem.

BRIEF SUMMARY OF THE INVENTION

In view of such problems of the prior art, a primary object of the present invention is to provide a card reader which would not contaminate or damage the card which serves as an information carrier.

A second object of the present invention is to provide a card reader which may have a simple structure and a very small height.

According to the present invention, these and other objects can be accomplished by providing a card reader for reading coded information from, and optionally writing coded information into, a card, comprising: a carriage which is received in a casing so as to be moveable between a card inserting position and an information accessing position; clamp means carried by the carriage for securing a card, from which information is to be read, to the carriage; linear conveyer means for selectively moving the carriage between the card inserting position and the information accessing position; and information accessing means disposed adjacent to the information accessing position to read information from the card carried by the carriage at the information accessing position.

By not using a pair of drive and pinch rollers as opposed to conventional card readers, the card is free from contamination by the rollers, and the operation reliability of the card reader is improved. Further, the elimination of rollers also contributes to the reduction in the overall height of the card reader.

According to a preferred embodiment of the present invention, the linear conveyer means comprises a linear motor consisting of a stator attached to the casing and a slider attached to the carriage. This embodiment is highly advantageous in simplifying the structure of the card reader and reducing the overall height of the card reader.

The carriage may be adapted to simply place a card thereon without any positive means to secure it, but it is more preferable if the carriage is provided with clamp means comprising a fixed clamp member, a moveable clamp member, solenoid means and return spring means, the moveable clamp member being adapted to be pressed against the fixed clamp member to grip the card therebetween by being selectively attracted toward the solenoid means against the spring force of the return spring means.

For improved operation reliability, it is preferable to provide interlocking means for preventing the motion of the carriage from the card inserting position to the information accessing position until the card is fully secured to the carriage, for instance by providing means in the moveable clamp member for engagement with a fixed part of the casing when the moveable clamp member is not clamping a card against the fixed clamp member.

According to a favorable layout of the internal structure of the card reader according to the present invention, the carriage comprises a planar member extending substantially horizontally and in parallel with the direction along which the carriage is conveyed, and the solenoid means depends from the planar member. Further, when the card consists of an IC card, the card reader may further include a contact unit which is pivotally attached to a bottom wall of the casing via a pivot pin extending parallel to the bottom wall, and another solenoid depending from a top wall of the casing, the contact unit comprising contact pieces extending in a first direction from the contact unit away from the pivot pin and an armature piece extending in a second direction, which is opposite to the first direction, from the contact unit away from the pivot pin, for cooperation with the solenoid means.

Alternatively, the information accessing means may be disposed in the casing to read information from the card carried by the carriage while the card is being conveyed by the carriage between the card inserting position and the inner most, instead of reading information from the card when it is at its inner most position.

BRIEF DESCRIPTION OF THE DRAWINGS

FIG. 1 is a sectional plan view of a first embodiment of the card reader according to the present invention;

FIG. 2 is a sectional view taken along line II—II of FIG. 1;

FIG. 5 is a sectional plan view of a second embodiment of the card reader according to the present invention;

FIG. 6 is a sectional view taken along line VI—VI of FIG. 6;

DETAILED DESCRIPTION OF THE PREFERRED EMBODIMENTS

Figure 3:
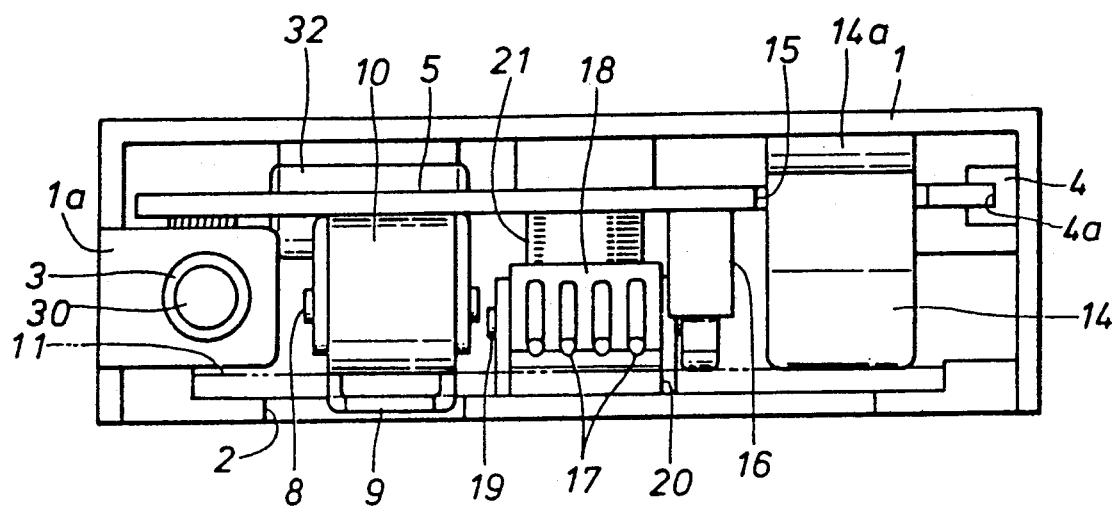
FIG. 3 is a sectional view taken along line III—III of FIG. 1.
Figure 4:
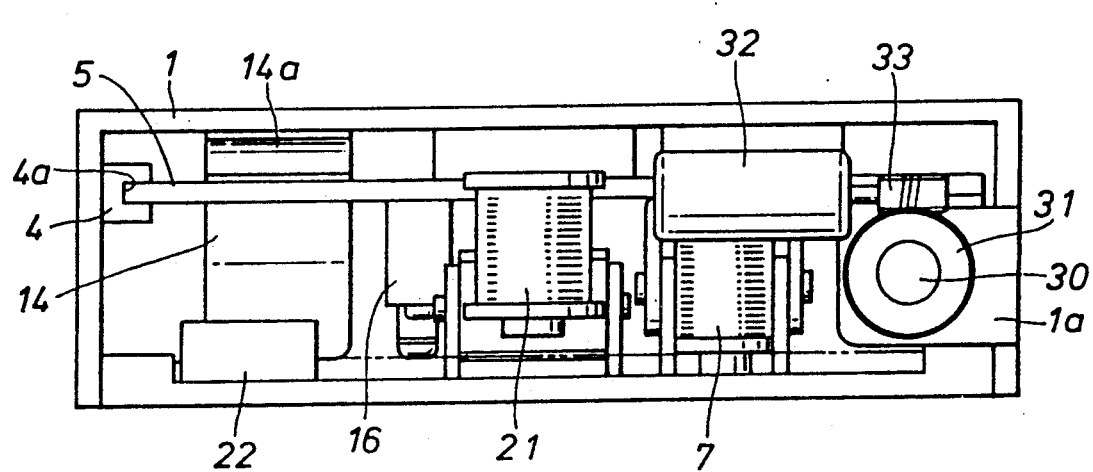
FIG. 4 is a sectional view taken along line IV—IV of FIG. 1.
Figure 7:
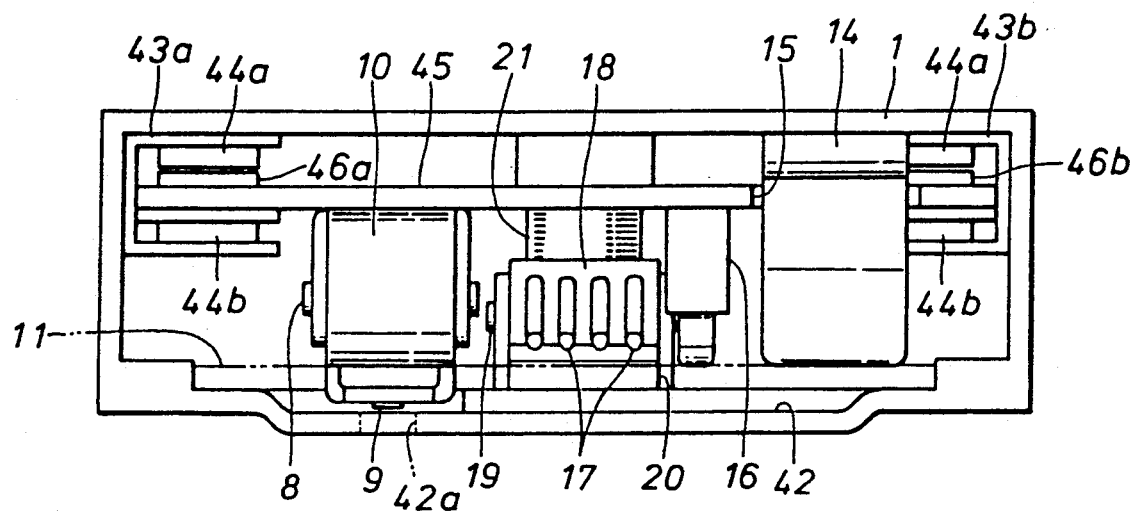
FIG. 7 is a sectional view taken along line VII—VII of FIG. 6.

FIGS. 1 through 4 show the first embodiment of the card reader according to the present invention. This card reader comprises a fixed casing 1 having the shape of an elongated box which is open at either longitudinal end. The bottom wall of this casing 1 is further provided with a large opening 2.

A pair of tabs 1a are cut out and bent inwardly from a side wall of the casing 1, and are provided with a bearing members 3 for rotatably supporting either longitudinal end of a threaded rod 30. The rear most end of the threaded rod 30 or the right end of the threaded road as seen in FIG. 1 projects rearwardly beyond the corresponding bearing member 3, and carries a worm gear 31 fixedly attached thereto. This worm gear 31 meshes with a worm 33 which is fixedly attached to the output shaft of an electric motor 32 and extends perpendicularly to the threaded shaft 30. To the inner surface of the other side wall of this casing 1 is fixedly attached a guide rail 4 which extends over the whole length of the casing 1 and is provided with a groove 4a along the internal face of the guide rail 4.

A carriage 5 comprising a planar member for carrying an IC card 11 as described hereinafter is guide by this guide rail 4 along one of its side edges by being received in the groove 4a of the guide rail 4, while the other side edge of the carriage 5 is provided with a pair of nut members 34 which are fixedly attached to the carriage 5 and mesh with the threaded rod 30. Therefore, by turning the threaded rod 30 in either direction with the motor 32, the carriage 5 is moved in either longitudinal direction by being driven by the threaded rod 30 and guided by the guide rail 4.

To the bottom surface of the carriage 5 is attached a solenoid 7 for selectively attracting a moveable clamp member 9 against the gravitational force acting upon the moveable clamp member 9 which is pivotally supported to the carriage 5 by a lateral pivot pin 8. If desired, the moveable clamp member 9 may be normally urged downward by the spring force of a spring member instead of or in addition to the gravitational force. Thus, by energizing the solenoid 7, it is possible to hold an IC card 11 by pressing the moveable clamp member 9 against a U-shaped fixed clamp member 10 which is fixedly attached to the bottom surface of the carriage 5. This IC card 11 is provided with a plurality of contact pads 13 in its front end portion for accessing an IC memory element incorporated in the card 11, and is optionally provided with a magnetic stripe 12 extending along the longitudinal direction of the card 11.

The carriage 5 is further provided with a limit switch 16 for detecting the insertion of a card, and a magnetic head 14 elastically depends from the top wall of the casing 1 by means of a U-shaped sheet spring 14a to get access to the data stored in the magnetic stripe 12 of the IC card 11. A cut-out 15 is provided in the carriage 5 in order to avoid an interference between the carriage 5 and the magnetic head 14.

The other longitudinal end of the casing 1 remote from the card inlet end or remote from the card inserting position is provided with a contact unit 18 which is provided with a main body which is pivotally supported by the bottom wall of the casing 1 via a lateral pin 19, a plurality of contact pieces 17 extending from the front face of the main body of the contact unit 18, and an armature piece 20 extending from the rear face of the main body of the contact unit 18. From the top wall of the casing 1 immediately above the armature piece 20 depends a solenoid 21 which can selectively urge the contact pieces 17 downwardly against the contact pads 13 of the IC card 11 by attracting the armature piece 20 upwardly, by means of the rocking motion of the main body of the contact unit 18 about the pivot pin 19. A limit switch 22 is placed adjacent to the contact unit 18 to detect the presence of the IC card 11 at the position where the contact pieces 17 can contact the corresponding contact pads 13 or at the information accessing position.

Now the operation of this card reader is described in the following.

When the carriage 5 is located at the position or the card inserting position shown in FIGS. 1 and 2, an IC card 11 is inserted into the casing 1 from the left end. As the front edge of the card 11 pushes the limit switch 16, the solenoid 7 is energized and the front end of the card 11 is gripped between the moveable clamp member 9 and the fixed clamp member 10. Then, the motor 32 is activated to turn the threaded rod 30 via the worm 33 and the worm gear 31. As a result, the carriage 5 along with the card 11 is conveyed to the information accessing position as indicated by the imaginary lines 5' and 11' in FIG. 1. As the IC card 11 is conveyed into the casing 1 carried by the carriage 5, the magnetic stripe 14 slides over the surface of the magnetic head 14, and the magnetic data stored in the magnetic stripe 12 is read by the magnetic head 14.

When the arrival of the IC card 11 at the information accessing position is detected by the limit switch 22, the solenoid 7 is de-energized, and the moveable clamp member 9 drops into the opening 2 and the IC card 11 is placed atop the bottom wall of the casing 1. At the same time, the solenoid 21 is energized, and the contact pieces 17 come into contact with the contact pads 13 by way of the rocking motion of the contact unit 18, whereby the required reading and/or writing of data from and/or into the IC memory element of the IC card 11 can be accomplished.

When the required accessing is completed, the solenoid 21 is de-energized to lift the contact pieces 17 away from the contact pads 13, and, then, the solenoid 7 is energized to grip the card 11 between the moveable and fixed clamp members 9 and 10. By driving the motor 32 in the opposite direction and turning the threaded rod 30 in the opposite direction, the carriage 5 along with the card 11 is again brought to the inlet end of the casing 1 so that the card 11 may be retrieved by the user after de-energizing the solenoid 9.

According to this embodiment, since the two solenoids 7 and 21 are not energized at the same time, the maximum electric power consumption of the card reader can be reduced.

FIGS. 5 through 8 show a second embodiment of the present invention, and the parts corresponding those of the preceding embodiment are denoted with like numerals.

The casing 1 is likewise constructed as an elongated box which is open at either longitudinal end, and its bottom wall is provided with a depression 42 of a large area instead of an opening. The side walls are each provided with a guide rail 43a and 43b having a C-shaped cross section with its open end directed inwardly. To the inner opposing surfaces of each of these guide rails 43a and 43b are fixedly secured a stator 44a and 44b, consisting of a plurality of permanent magnets or coils, of a linear motor.

This card reader further comprises a carriage 45 which carries, along either lateral edges thereof, a pair of sliders 46a and 46b, consisting of plurality of coils or permanent magnets, which form a pair of linear motors in cooperation with the corresponding stators 44a and 44b, respectively.

A solenoid 7 is fixedly attached to the carriage 45 in the same manner as in the preceding embodiment to selectively attract a moveable clamp member 9 which forms a clamp in cooperation with a fixed clamp member 10 to grip an IC card therebetween. Other parts of the present embodiment are similar to the corresponding parts of the preceding embodiment.

Figure 8:
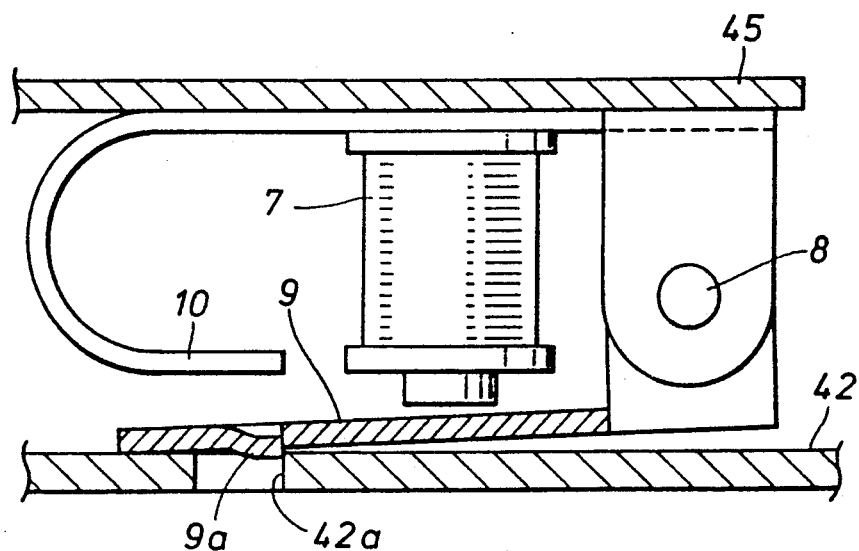
FIG. 8 is an enlarged sectional view of the clamping mechanism for securing a card to the carriage in the embodiment shown in FIGS. 5 through 7.

The operation of this embodiment is basically similar to that of the preceding embodiment, but, as shown in FIG. 8, the lower surface of the moveable clamp member 9 is provided with a projection 9a which is adapted to engage with a hole 42a provided in the depression 42 of the bottom wall of the casing 1 when the carriage 45 is at its outer most position or the card inserting position and the moveable clamp member 42 rests upon the bottom wall of the casing 1 under its own weight or by a spring force of a return spring member not shown in the drawings. However, when the moveable clamp member 9 is attracted to the solenoid 7, the projection 9a of the moveable clamp member 9 is disengaged from the engagement hole 42a.

According to this embodiment, by provision of the projection 9a and the hole 42a, the carriage 45 can be conveyed to the information accessing position inside the casing 1 only when the IC card 11 is gripped between the moveable clamp member 9 and the fixed clamp member 10 by energizing the solenoid 7. In other words, an interlock for preventing the carriage 45 to be conveyed into the casing 1 before properly securing the IC card 11 to the carriage 45 is formed, and the reliability of the operation of the card reader is improved.

In the present embodiment, this interlock was accomplished by mechanical means, but it is also possible to produce such an interlocking action by magnetically or electrically detecting the full insertion of a card or the actuation of clamping means for securing a card to the carriage, and electrically or otherwise controlling the conveyer means according to the result of such a detection.

Further, a threaded rod and linear motors were used as the conveyer means for moving an inserted card to and from the access position in the above embodiments, respectively, but it is also possible to use a rack and pinion mechanism, a combination of pulleys and wire, a link mechanism or other linear conveyer means. The information media for the present invention is not limited by the above embodiments which were designed for reading information from IC cards, but may also be other forms of information media, such as magnetic cards, magnetic tickets, perforated cards, optical cards, and so on.

Throughout the disclosure and claims of this application, the horizontal orientation of the casing was defined for the convenience of description, but as persons skilled in the art can readily understand, the orientation of the card reader is not limited by the horizontal arrangement referred to in the disclosure and claims. As a matter of fact, it is possible to use the card reader in a vertical arrangement in which the bottom wall and the top wall face sideways. Likewise, it is possible to use the card reader in the inverted orientation with its bottom wall facing upward and its top wall facing downward.

What we claim is:

1. A card reader for reading coded information from, and optionally writing coded information into, a card, said card reader comprising:
    a casing;
    a carriage received in said casing so as to be movable between a card inserting position and an information accessing position;
    clamp means carried by said carriage for securing a card, from which information is to be read, to said carriage;
    linear conveyer means for selectively moving said carriage between said card inserting position and said information accessing position upon the actuation of said clamp means;
    information accessing means disposed adjacent said information accessing position to read information from said card carried by said carriage at said information accessing position; and
    interlocking means for preventing movement of said carriage from said card inserting position to said information accessing position until said card is fully secured to said carriage.

* * * * *